(12) United States Patent
Izumi et al.

(10) Patent No.: US 10,569,456 B2
(45) Date of Patent: Feb. 25, 2020

(54) RESIN MOLDED ARTICLE AND METHOD FOR MANUFACTURING THE SAME

(71) Applicant: DENSO CORPORATION, Kariya, Aichi-pref. (JP)

(72) Inventors: Ryosuke Izumi, Kariya (JP); Noritaka Inoue, Kariya (JP); Hodaka Mori, Kariya (JP)

(73) Assignee: DENSO CORPORATION, Kariya (JP)

( * ) Notice: Subject to any disclaimer, the term of this patent is extended or adjusted under 35 U.S.C. 154(b) by 188 days.

(21) Appl. No.: 15/531,758

(22) PCT Filed: Dec. 21, 2015

(86) PCT No.: PCT/JP2015/006352
§ 371 (c)(1),
(2) Date: May 31, 2017

(87) PCT Pub. No.: WO2016/103672
PCT Pub. Date: Jun. 30, 2016

(65) Prior Publication Data
US 2017/0266857 A1    Sep. 21, 2017

(30) Foreign Application Priority Data

Dec. 26, 2014  (JP) .................... 2014-265667
May 25, 2015   (JP) .................... 2015-105603
Nov. 30, 2015  (JP) .................... 2015-233453

(51) Int. Cl.
*B29C 45/14*        (2006.01)
*C08J 5/12*         (2006.01)
(Continued)

(52) U.S. Cl.
CPC .............. *B29C 45/14* (2013.01); *C08J 5/124* (2013.01); *B29K 2067/006* (2013.01);
(Continued)

(58) Field of Classification Search
CPC ................. B29C 45/14; B29C 66/742; B29C 2045/14868; B29K 2305/00;
(Continued)

(56) References Cited

U.S. PATENT DOCUMENTS 4,370,292 A    1/1983   Yanase et al.
2009/0082525 A1   3/2009   Nakamura et al.
(Continued)

FOREIGN PATENT DOCUMENTS

EP      0 676 448 A1    10/1995
JP      2004-223936 A   8/2004
(Continued)

OTHER PUBLICATIONS

Baldan, Review. Adhesively-bonded joints and repairs in metallic alloys, polymers and composite materials: Adhesives, adhesion theories and surface pretreatment, 2004, Journal of Materials Science, vol. 39, pp. 1-49. (Year: 2004).*
(Continued)

*Primary Examiner* — Monique R Jackson
(74) *Attorney, Agent, or Firm* — Posz Law Group, PLC

(57) ABSTRACT

A resin molded article includes an insert component and a synthetic resin member sealing the insert component. The insert component is provided by a primary molded product of a thermosetting resin, or a metal component, and has a functional group. The synthetic resin member is provided by a synthetic resin including a base polymer of a thermoplastic resin and a bonding component bonding with the functional group included in the insert component. The synthetic resin member has a sea structure formed of a continuous phase including the base polymer, and at least a part of the bonding component is present as a dispersed component in the sea structure. The dispersed component bonds with the functional group included in the insert component.

3 Claims, 8 Drawing Sheets

(51) Int. Cl.
　　　*B29K 67/00* (2006.01)
　　　*B29K 81/00* (2006.01)
(52) U.S. Cl.
　　　CPC ....... *B29K 2081/04* (2013.01); *C08J 2381/02* (2013.01); *C08J 2463/00* (2013.01)
(58) Field of Classification Search
　　　CPC ............ B29K 2305/02; B29K 2305/12; B29K 2705/00; B29K 2705/02; B29K 2705/12
　　　See application file for complete search history.

(56) References Cited

U.S. PATENT DOCUMENTS

| | | | |
|---|---|---|---|
| 2009/0280296 A1* | 11/2009 | Naritomi | B29C 45/14311 428/141 |
| 2010/0018025 A1* | 1/2010 | Naritomi | B29C 45/14311 29/458 |
| 2010/0189958 A1* | 7/2010 | Naritomi | B29C 45/14311 428/141 |
| 2015/0158221 A1 | 6/2015 | Izumi et al. | |

FOREIGN PATENT DOCUMENTS

| | | | |
|---|---|---|---|
| JP | 2006-338449 A | | 12/2006 |
| JP | 2007050630 A | * | 3/2007 |
| JP | 2009-080803 A | | 4/2009 |
| JP | 4722954 B2 | | 4/2011 |
| JP | 2012-078970 A | | 4/2012 |

OTHER PUBLICATIONS

Grujicic, An overview of the polymer-to-metal direct-adhesion hybrid technologies for load-bearing automotive components, 2008, Journal of Materials Processing Technology, vol. 197, pp. 363-373. (Year: 2008).*

Bishopp, Surface Pretreatment for Structural Bonding, Chapter 4, Handbook of Adhesives and Sealants, 2005, Chapter 4, Handbook of Adhesives and Sealants, pp. 163-214. (Year: 2005).*

Machine translation of JP2007-050630A, published Mar. 2007. (Year: 2007).*

* cited by examiner

RESIN MOLDED ARTICLE AND METHOD FOR MANUFACTURING THE SAME

CROSS REFERENCE TO RELATED APPLICATIONS

This application is a U.S. national stage application of International Patent Application No. PCT/JP2015/006352 filed on Dec. 21, 2015 and is based on Japanese Patent Applications No. 2014-265667 filed on Dec. 26, 2014, No. 2015-105603 filed on May 25, 2015, and No. 2015-233453 filed on Nov. 30, 2015, the disclosures of which are incorporated herein by reference.

TECHNICAL FIELD

The present disclosure relates to a resin molded article in which a primary molded product of a thermosetting resin, or a metal member is insert molded by a synthetic resin member such as a thermoplastic resin, and a method for manufacturing such a resin molded article.

BACKGROUND ART

In Patent Literature 1, there has been proposed a resin molded article of a structure in which an insert component (included component) is insert molded by a thermosetting resin composition including a thermoplastic resin mixed therein. In the resin molded article, the mixed component in the thermosetting resin composition, which includes the thermoplastic resin mixed therein, is dispersed at the surface of the insert component in order to relax the stress at the interface between the thermosetting resin composition and the insert component. Specifically, the insert component is heated during molding, thereby to cause a temperature gradient. Using the temperature gradient, the formation of the continuous phase and the flocculated phase in the synthetic resin of the thermoplastic resin and the thermosetting resin, in other words, the formation of the sea-island structure is controlled. Namely, at the position away from the interface with the insert component, the phase structure in the synthetic resin is configured such that the thermoplastic resin forms a continuous phase (a so-called sea structure), and the thermosetting resin forms a flocculated phase (a so-called island structure). Whereas, at the interface with the insert component, the phase structure in the synthetic resin includes the thermoplastic resin as a flocculated phase and the thermosetting resin as a continuous phase.

As described above, since the insert component is heated during the molding, at a portion which is desired to be bonded with the insert component, the synthetic resin is made to have a phase structure in which the thermoplastic resin forms a flocculated phase, and the thermosetting resin forms a continuous phase.

Note that the flocculated phase herein referred to means the phase separated while having a definite interface between it and the continuous phase, or, in other words, can be referred to as a separate phase.

PATENT LITERATURE

Patent Literature 1: JP 2004-223936 A

SUMMARY

However, even in the phase structure shown in Patent Literature 1, an amorphous resin layer is formed, and even in a crystalline thermoplastic resin, the base material strength is reduced. Accordingly, breakage tends to be caused at the bonding interface, and hence the bonding strength is reduced. For this reason, it becomes impossible to obtain a desired bonding strength between the insert component and the synthetic resin.

It is an object of the present disclosure to provide a higher bonding strength in a resin molded article in which an insert component is sealed by a synthetic resin.

An embodiment of a resin molded article includes: an insert component formed of a primary molded product of a thermosetting resin, or a metal component, and having a functional group; and a synthetic resin member sealing the insert component, and formed of a synthetic resin including a base polymer of a thermoplastic resin and a bonding component for bonding with the functional group included in the insert component. The synthetic resin member has a sea structure formed of a continuous phase including the base polymer. At least a part of the bonding component is present as a dispersed component in the sea structure, and the dispersed component bonds with the functional group included in the insert component.

Thus, in the resin molded article, the bonding component for bonding with the functional group included in the insert component formed of a thermosetting resin or the like is added to the thermoplastic resin serving as the base polymer of the synthetic resin member for sealing the insert component. Further, the continuous phase (sea structure) is formed of the base polymer, and bonding component molecules in a number required for obtaining the target bonding strength with the insert component are dispersed in the continuous phase. As a result, the functional group of the bonding component added to and dispersed in the synthetic resin member is allowed to chemically react with the functional group present at the surface of the insert component. This can provide a higher bonding strength.

An embodiment of a method for manufacturing the resin molded article includes performing a molecular simulation and setting conditions for molding. The performing of the molecular simulation includes: setting conditions for molding of the synthetic resin member, the conditions including the temperature and the pressure during the molding of the synthetic resin member, a solute concentration ρ that is a value obtained by dividing the number of molecules of the bonding component by the volume of the base polymer, a constituent material of the bonding component serving as a solute species, and a constituent material of the base polymer serving as a solvent species; setting an interatomic interaction that is an interaction between atoms forming the base polymer and atoms forming the bonding component; calculating a first solvation free energy when the solute concentration is defined as x%; calculating a second solvation free energy when the solute concentration is defined as 100%; calculating an equilibrium constant α of dispersion and flocculation of the bonding component in the base polymer based on the first and second solvation free energies, and calculating a dispersed component density ρ1 of the density of the dispersed component of the bonding component based on the equilibrium constant α and the solute concentration ρ, in which a density of chemical bonds including any of a covalent bond, a coordinate bond, an ionic bond, and a hydrogen bond satisfying the bonding energy required for obtaining the target bonding strength at an interface between the insert member and the synthetic resin member is defined as ρ1₀, and the equilibrium constant α is expressed as Mathematical Expression 1; and confirming that the dispersed component density ρ1 and the equilibrium constant α satisfy Mathematical Expression 2.

$$\alpha = \rho_1/\rho_2 = \exp\left(-\frac{\Delta\mu_1 - \Delta\mu_2}{RT}\right) \quad \text{[Mathematical Expression 1]}$$

$$\rho 1 = \left\{\frac{\alpha}{1+\alpha}\right\} \times \rho > \rho 1_0 \quad \text{[Mathematical Expression 2]}$$

BRIEF DESCRIPTION OF DRAWINGS

The above and other objects, features and advantages of the present disclosure will become more apparent from the following detailed description made with reference to the accompanying drawings, in which.

DETAILED DESCRIPTION

Figure 1:
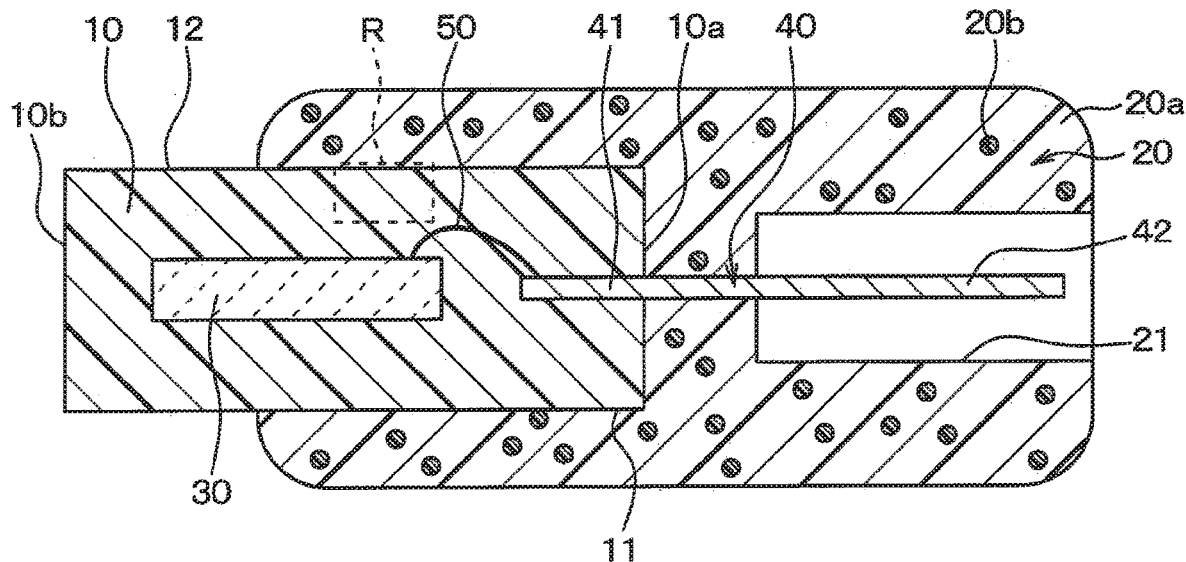
FIG. 1 is a view showing a cross-sectional configuration of a semiconductor device as a resin molded article according to a first embodiment of the present disclosure.

Hereinafter, embodiments of the present disclosure will be described with reference to the drawings. Note that the mutually same or similar portions are designated with the same reference numerals and signs to be described in the following respective embodiments.

(First Embodiment)

A resin molded article according to a first embodiment of the present disclosure will be described with reference to FIG. 1. Note that the resin molded article described in the present embodiment is, for example, mounted in a vehicle such as a car, and is applied as a semiconductor device for driving various electronic devices for vehicles.

As shown in FIG. 1, the semiconductor device as the resin molded article of the present embodiment includes an insert component 10, and a synthetic resin member 20 that seals a part of the surface of the insert component 10.

The insert component 10 is provided by a primary molded product formed of a thermosetting resin having a functional group at the surface such as an epoxy resin, or a metal component having a functional group at the surface. The insert component 10 formed of a thermosetting resin may contain a filler including an insulating material such as silica or alumina, if required. The insert component 10 provided by such a primary molded product is formed by performing molding and thermosetting treatments by a transfer molding, compression molding, or potting method.

Further, the synthetic resin member 20 is formed of a polymer alloy resin obtained by adding a thermosetting resin such as an epoxy resin serving as a bonding component 20b for bonding with the functional group included in the insert component 10 to a thermoplastic resin including PPS (polyphenylene sulfide), PBT (polyphenylene terephthalate), or the like as a base polymer 20a. For example, the polymer alloy resin is injection molded so as to seal a part of the insert component 10, thereby to form a synthetic resin member 20. Herein, as the bonding component 20b for bonding with the functional group included in the insert component 10 added into the synthetic resin member 20, for example, an epoxy resin is mentioned. However, any polymers are acceptable so long as they are polymers forming the functional group (e.g., the reactive group) having a bonding effect, and the bonding component 20b is not limited to a thermosetting resin. The bonding component 20b can be formed of a polymer having any one of, or a plurality of, for example, a hydroxyl group, an epoxy group, an amino group, and a carbonyl group. The functional group of the bonding component 20b added to the synthetic resin member 20 chemically reacts with the functional group present at the surface of the insert component 10. This enables high adhesion binding.

In the synthetic resin member 20, in the state before solidification, the base polymer 20a and the bonding component 20b form a continuous phase (sea structure) and a flocculated phase (island structure). Further, the synthetic resin member 20 has a structure in which bonding component molecules in a number required for obtaining the target bonding strength with the insert component 10 are dispersed in the continuous phase.

Figure 2A:
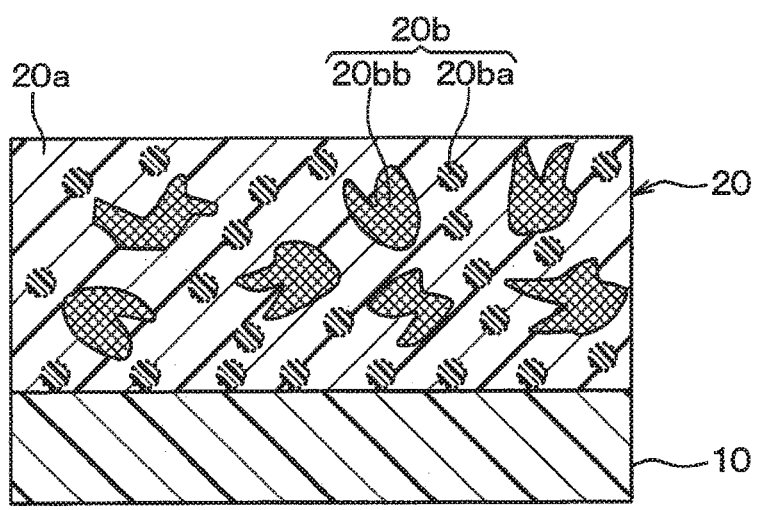
FIG. 2A is a cross-sectional view showing an image in which a bonding component in a continuous phase formed of a base polymer and the bonding component bonds with the surface of an insert component.

For example, as shown in FIG. 2A, the base polymer 20a and at least a part of the bonding component 20b are merged with each other at the boundary part thereof, so that the interface at the boundary part is not definite. At least a part of the bonding component 20b is a dispersed component 20ba. A component 20bb not being dispersed but being flocculated may be present. However, at least the dispersed component 20ba is present.

Figure 2B:
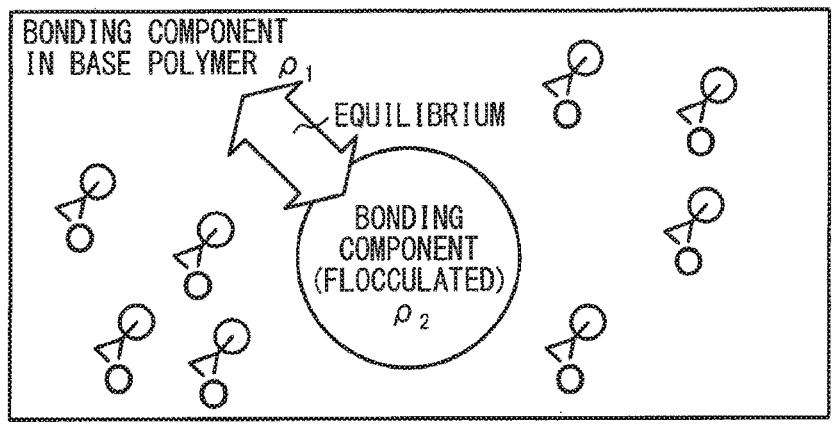
FIG. 2B is an enlarged view showing the state of bonding component molecules dispersed in the continuous phase shown in FIG. 2A.

More particularly, as shown in FIG. 2B, the bonding component 20b includes the uniformly dispersed component 20ba present therein, even if a flocculated component is present. The dispersed component 20*ba* allows the functional group to be present while being dispersed.

Figure 3A:
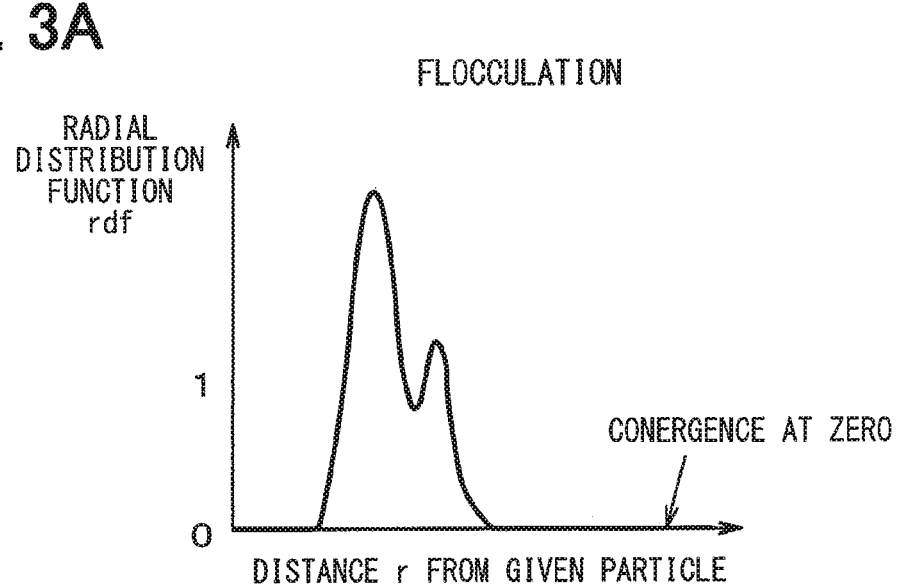
FIG. 3A is a view showing the relationship between the distance r from a given particle showing flocculation and the radial distribution function rdf.
Figure 3B:
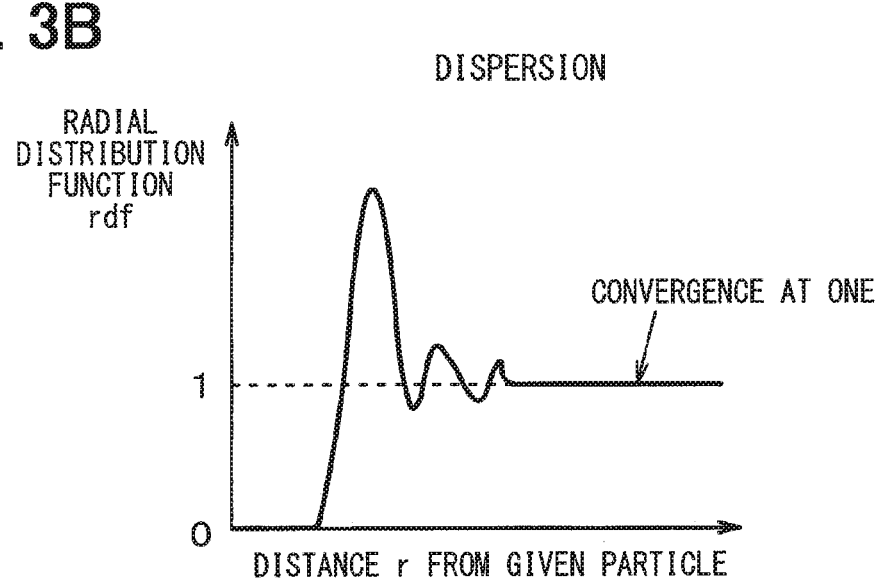
FIG. 3B is a view showing the relationship between the distance r from a given particle showing dispersion and the radial distribution function rdf.

Note that flocculation means the case where the radial distribution function converges at 0 with an increase in distance r from a given particle as shown in FIG. 3A, and dispersion means the case where the radial distribution function converges at 1 with an increase in distance r from a given particle as shown in FIG. 3B.

Specifically, the synthetic resin member 20 has a structure in which bonding component molecules in a number required for obtaining the target bonding strength with the insert component 10 are dispersed in the continuous phase by setting the conditions for the base polymer 20*a* and the bonding component 20*b* so as to satisfy the following mathematical expression.

First, the value (=N/V) obtained by dividing the density of the bonding component 20*b* added into the continuous phase (the amount of the bonding component 20*b* per unit volume), in other words, the amount N of the bonding component 20*b* added equivalent to the number of the bonding component molecules by the volume V of the base polymer 20*a* is referred to as a solute concentration $\rho$. The solute concentration $\rho$ corresponds to the total number of the reactive groups of the bonding component 20*b* added per unit volume. The density of the dispersed component of the bonding component 20*b* (which will be hereinafter referred to as a dispersed component density) is referred to as $\rho 1$, and the density of the flocculated component of the bonding component 20*b* (which will be referred to as a flocculated component density) is referred to as $\rho 2$. Note that $\rho = \rho 1 + \rho 2$. Then, the equilibrium constant of dispersion and flocculation (dispersion–flocculation equilibrium constant) $\alpha$ expressed by the following Mathematical Expression 1 is defined so that the base polymer 20*a* and the bonding component 20*b* are dispersed, and the dispersed component density $\rho 1$ and the equilibrium constant $\alpha$ are set so as to satisfy the values shown in Mathematical Expression 2.

$$\alpha = \rho_1/\rho_2 = \exp\left(-\frac{\Delta\mu_1 - \Delta\mu_2}{RT}\right) \quad \text{[Mathematical Expression 1]}$$

In Mathematical Expression 1, R represents the ideal gas constant and T represents absolute temperature (in Kelvin).

$$\rho 1 = \left\{\frac{\alpha}{1+\alpha}\right\} \times \rho > \rho 1_0 \quad \text{[Mathematical Expression 2]}$$

Note that the Mathematical Expression 2 corresponds to the expression obtained by solving the two equations of $\rho = \rho 1 + \rho 2$ and $\alpha = \rho 1/\rho 2$ for $\rho 1$. In the present expression, $\rho 1_0$ represents the number density of chemical bonds necessary for bonding formation at the interface between the insert member 10 and the synthetic resin member 20 as described later.

Herein, the dispersed component density $\rho 1$ and the equilibrium constant $\alpha$ are parameters indicating the dispersibility. A larger dispersed component density $\rho 1$ or a larger equilibrium constant $\alpha$ indicates higher dispersibility and higher bonding property.

Figure 4:
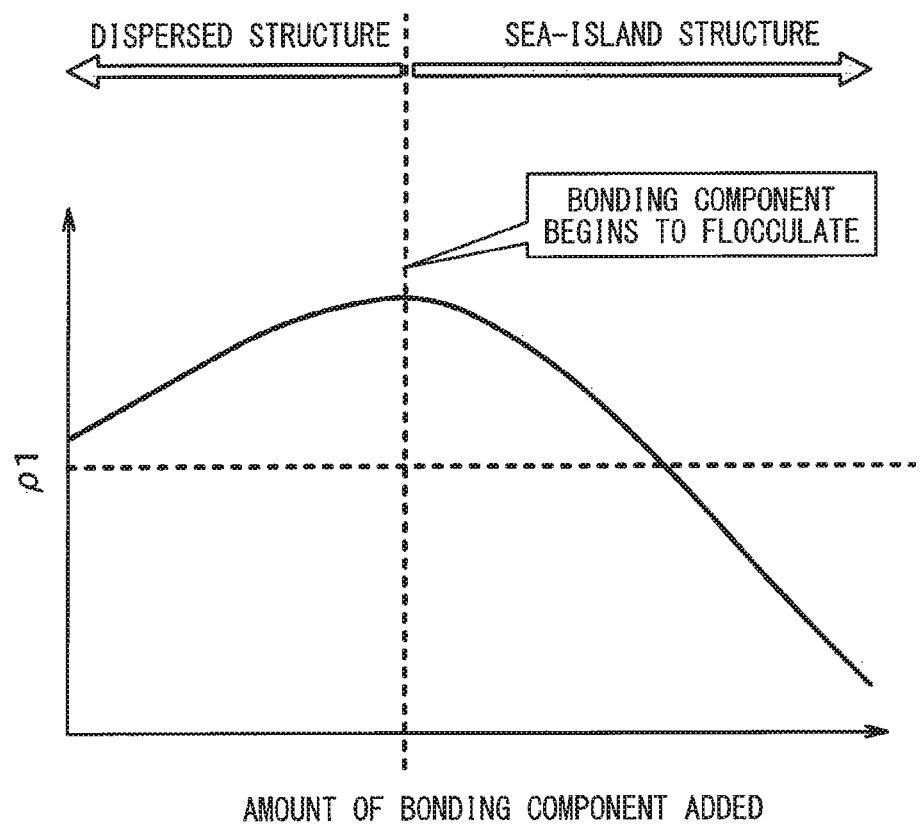
FIG. 4 is a view showing the relationship between the amount of the bonding component added and the dispersed component density ρ1.

As shown in FIG. 4, with an increase in amount of the bonding component 20*b* added, the dispersed component density $\rho 1$ gradually increases. When the amount of the bonding component 20*b* added exceeds a given value, the dispersed component density $\rho 1$ decreases. When the amount of the bonding component 20*b* added is an amount smaller than the amount such that the dispersed component density $\rho 1$ becomes a given value, a structure formed of only a continuous phase is formed. An amount of more than the amount leading to the given value results in a sea-island structure.

Figure 5:
FIG. 5 is a view showing the relationship between the kind of the skeleton of the polymerization part of a polymer and the dispersed component density ρ1.

Whereas, the dispersed component density $\rho 1$ varies according to the composition of the bonding component 20*b*. Specifically, the dispersed component density $\rho 1$ varies according to the skeleton of the polymerization part of the polymer forming the bonding component 20*b*. For example, as shown in FIG. 5, for example, when three kinds of the skeletons A to C have different dispersed component densities $\rho 1$, a skeleton with a larger dispersed component density $\rho 1$ becomes more likely to have a structure formed of only a continuous phase.

Figure 6:
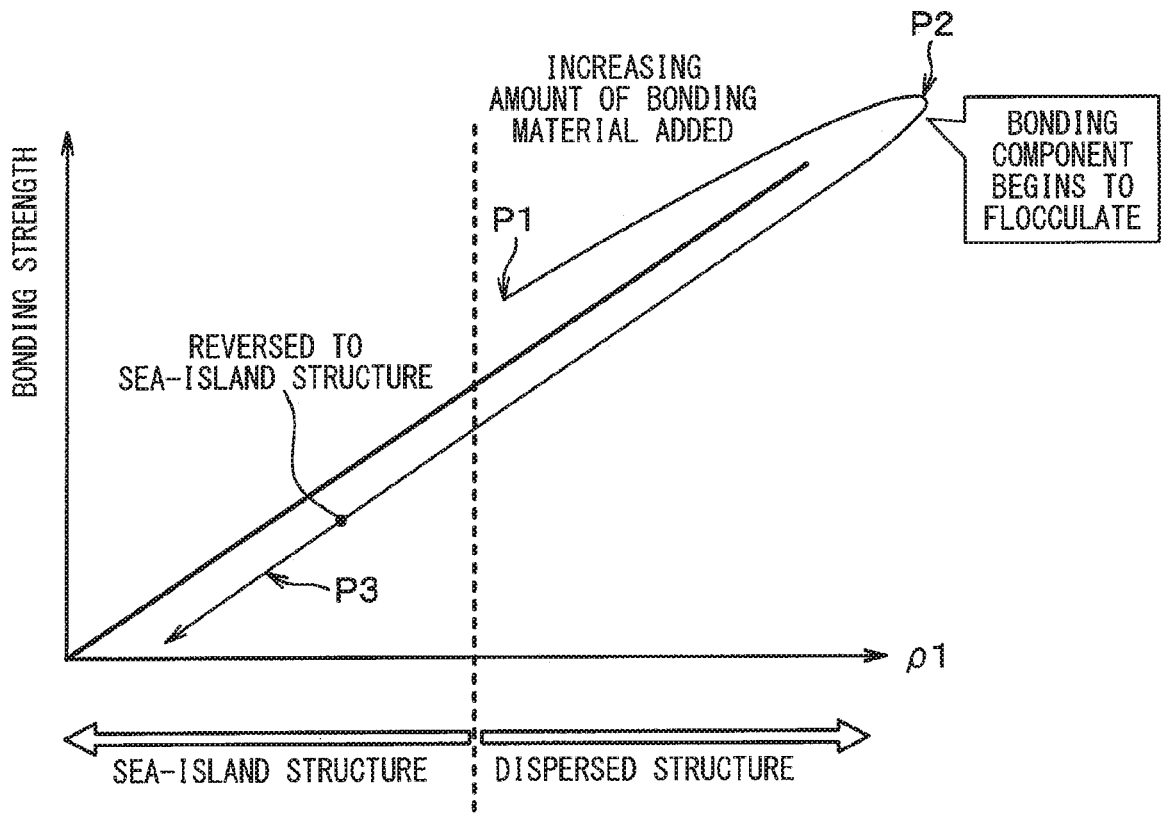
FIG. 6 is a view showing the relationship between the dispersed component density ρ1 and the bonding strength.

Further, assuming the structure in which the insert component 10 is sealed by the synthetic resin member 20, the synthetic resin member 20 with a varied dispersed component density $\rho 1$ was secondary molded on the insert component 10. These were pulled in mutually opposite directions in parallel with the interface, thereby to examine the fracture mode. As a result, as shown in FIG. 6, even with the structure in which the amount of the bonding component 20*b* added was small, and which was formed of only a continuous phase, when the dispersed component density $\rho 1$ was small (P1 in FIG. 6), a fracture mode was caused in which the insert component 10 and the synthetic resin member 20 underwent interfacial peeling. Then, when the amount of the bonding component 20*b* added increased, and the dispersed component density $\rho 1$ increased (P2 in FIG. 6), the bonding strength increased. This resulted in a fracture mode in which the insert components 10 and the synthetic resin member 20 were mutually fractured at their base materials in the vicinity of the interface. Further, when the amount of the bonding component 20*b* added increased, and the dispersed component density $\rho 1$ decreased (P3 in FIG. 6), the structure this time was reversed to a sea-island structure, so that the bonding strength was reduced. This resulted in a fracture mode in which the synthetic resin member 20 was fractured in the vicinity of the interface with the insert component 10.

Also from such results, the magnitude of the dispersed component density $\rho 1$ becomes the parameter indicating the dispersibility. A larger dispersed component density $\rho 1$ results in a structure with a higher dispersibility, and a higher bonding strength. Note that, although the dispersed component density $\rho 1$ is mentioned as an example, the same also applies to the equilibrium constant $\alpha$. A larger equilibrium constant $\alpha$ results in a structure with a higher dispersibility and a higher bonding strength.

The synthetic resin member 20 thus configured is provided so as to seal a part of the surface of the insert component 10. As a result, a part of the surface of the insert component 10 becomes a sealed surface 11 sealed by the synthetic resin member 20. Then, the residual part of the parts other than the sealed surface 11 of the surface of the insert component 10 becomes an exposed surface 12 exposed from the synthetic resin member 20.

Herein, the insert component 10 is formed as the one formed in the shape of a rectangular parallelepiped-shaped block. Then, a part of the surface of the inset component 10 at one end 10*a* in the longitudinal direction of the insert component 10 serves as the sealed surface 11, and the residual part of the surface of the insert component 10 adjacent to the other end 10*b* in the longitudinal direction serves as the exposed surface 12.

The insert component 10 has a semiconductor element 30 and an electrically connecting member 40 sealed by the insert component 10 in the inside thereof.

The semiconductor element 30 is a sensor chip formed of a silicon semiconductor or the like for use in a magnetic sensor, an optical sensor, a pressure sensor, or the like. Such a semiconductor element 30 is formed by a general semiconductor process.

For example, in the case of the semiconductor element 30 for a magnetic sensor, the whole of the semiconductor element 30 is sealed by the insert component 10, so that the semiconductor element 30 detects an external magnetism through the insert component 10. Whereas, in the case of the semiconductor element 30 for an optical sensor or a pressure sensor, an opening not shown which opens a part of the semiconductor element 30 is formed in the insert component 10, so that the semiconductor element 30 detects a light or a pressure through the opening.

On the other hand, the electrically connecting member 40 is for electrically connecting the semiconductor element 30 and a wiring member outside the semiconductor device not shown. Herein, the part 41 of the electrically connecting member 40 is covered with the insert component 10, and the residual part 42 protrudes from the sealed surface 11 in the insert component 10. Whereas, the residual part 42 of the electrically connecting member 40 is sealed by the synthetic resin member 20 outside the insert component 10, and the tip part thereof is exposed from the synthetic resin member 20.

Herein, the part 41 of the electrically connecting member 40 is electrically connected with the semiconductor element 30 in the insert component 10. The connecting method with the semiconductor element 30 has no particular restriction. However, herein, connection is achieved by a bonding wire 50 of Al, Au, or the like.

On the other hand, the synthetic resin member 20 seals the residual part 42 of the electrically connecting member 40. However, an opening 21 is formed in the synthetic resin member 20. Then, at the opening 21, a further part of the residual part 42 of the electrically connecting member 40 is exposed to the outside of the synthetic resin member 20.

The opening 21 of the synthetic resin member 20 is the site through which an external wiring member such as a connector member not shown is inserted for connection. As a result, the external wiring member and the electrically connecting member 40 are electrically connected.

In other words, the electrically connecting member 40 functions as the one for performing detection, outputting, and the like of the semiconductor element 30. The semiconductor element 30 enables an electrical exchange with the outside of the device through the electrically connecting member 40. As such an electrically connecting member 40, in the present embodiment, a terminal formed of a rod-like member of Cu, Al, or the like is used. However, other than this, a circuit board or the like may be used as the electrically connecting member 40.

Further, as described above, the residual part 42 of the electrically connecting member 40 is sealed by the synthetic resin member 20 in such a manner as to protrude from the sealed surface 11 in the insert component 10, and such that further, the tip part protrudes therefrom.

The resin molded article of the present embodiment is configured as described above. The resin molded article thus formed has the following structure: the base polymer 20*a* and the bonding component 20*b* forming the synthetic resin member 20 form a continuous phase (sea structure) and a flocculated phase (island structure), and bonding component molecules in a number required for obtaining the target bonding strength with the insert component 10 are dispersed in the continuous phase. For this reason, it is possible to achieve a high bonding strength.

Figure 7:
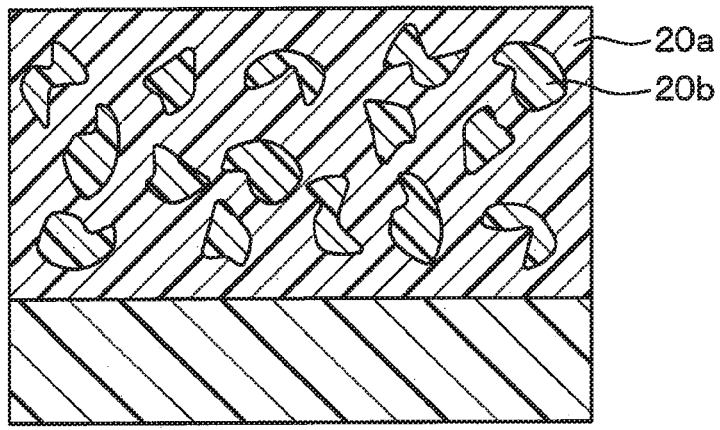
FIG. 7 is a cross-sectional view showing an example of a sea-island structure of the base polymer and the bonding component.
Figure 8:
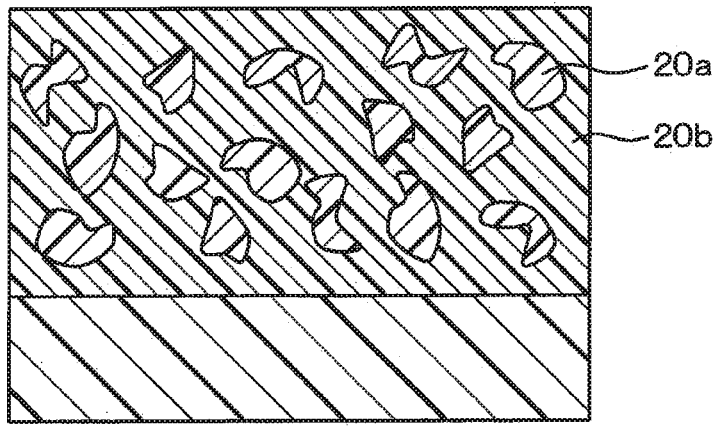
FIG. 8 is a cross-sectional view showing another example of the sea-island structure of the base polymer and the bonding component.

Namely, as shown in FIG. 7, in the case of such a fully phase separated structure that the base polymer 20*a* forms a continuous phase, and the bonding component 20*b* forms a flocculated phase, flocculation prevents the bonding component from appearing on the side of the interface with the insert component 10. For this reason, the bonding property at the interface between the insert component 10 and the synthetic resin member 20 is reduced. Similarly, as shown in FIG. 8, in the case of such a fully phase separated structure that the base polymer 20*a* forms a flocculated phase, and the bonding component 20*b* forms a continuous phase, the bonding component 20*b* is amorphous. Accordingly, in the vicinity of the interface with the insert component 10, the strength of the synthetic resin member 20 serving as the base material is reduced. For this reason, base material fracture causes separation of the synthetic resin member 20 from the insert component 10.

In contrast, with the configuration of the present embodiment, it is possible to suppress the reduction of the bonding property at the interface between the insert member 10 and the synthetic resin member 20, and it is possible to suppress the reduction of the strength of the synthetic resin member 20 in the vicinity of the interface thereof. Therefore, it is possible to achieve a high bonding strength.

Subsequently, a method for manufacturing a semiconductor device as the resin molded article of the present embodiment will be described.

First, as a first step, the insert component 10 is prepared. For example, as shown in FIG. 1, the semiconductor element 30 and the electrically connecting member 40 are connected by the bonding wire 50, and then, are sealed by a thermosetting resin, thereby providing a primary molded product as the insert component 10.

Subsequently, as a second step, a polymer alloy resin forming the synthetic resin member 20 for sealing the insert component 10 by secondary molding is prepared. Then, a semiconductor device as a resin molded article in which the insert component 10 is sealed by the synthetic resin member 20 is produced.

In this case, molecular simulation described below is performed so as to achieve a structure in which the base polymer 20*a* and the bonding component 20*b* forming the polymer alloy resin form a continuous phase (sea structure) and a flocculated phase (island structure), and bonding component molecules in a number required for obtaining the target bonding strength with the insert component 10 are dispersed in the continuous phase. Thus, the dispersibility of the base polymer 20*a* and the bonding component 20*b* is calculated. Then, based on the dispersibility calculation, as various conditions for forming the synthetic resin member 20, the conditions satisfying the desired dispersed component density $\rho 1$ and equilibrium constant $\alpha$ are set.

Hereinafter, with reference to FIGS. 9 to 12, the calculation technique of the equilibrium constant $\alpha$ will be described.

Figure 9:
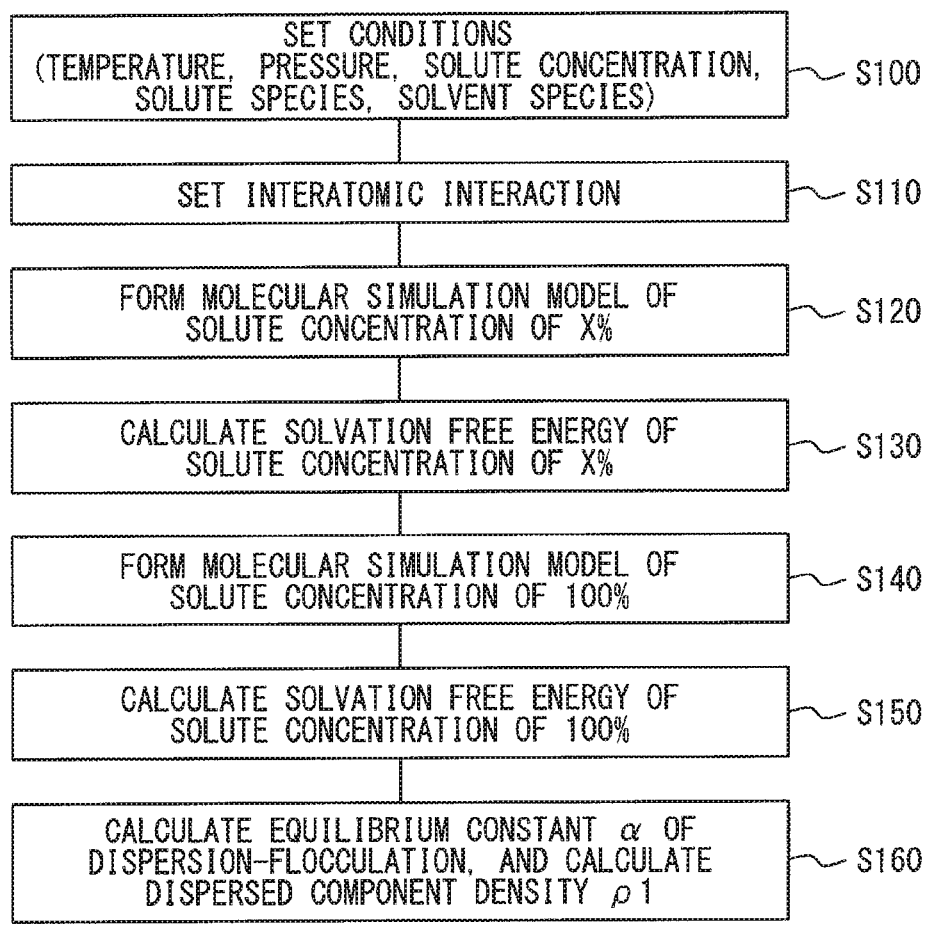
FIG. 9 is a flowchart of a molecular simulation for calculating the number (number density) of the bonding component molecules required in the continuous phase for obtaining the target bonding strength with the insert component.

As shown in FIG. 9, as Step 100, various conditions for secondary molding are set. The various conditions herein referred to mean the constituent materials for the base polymer 20*a* serving as the solvent species, and the constituent materials for the bonding component 20*b* serving as the solute species for forming the synthetic resin member 20, the solute concentration (i.e., the number density) $\rho$, the temperature and the pressure during secondary molding, and the like.

In this case, as the constituent material for the base polymer 20a serving as the solvent species, a thermoplastic resin is used. For example, as the thermoplastic resin, PPS (n=80, where n represents the degree of polymerization) expressed by Chemical Formula 1 is used.

[Chemical Formula 1]

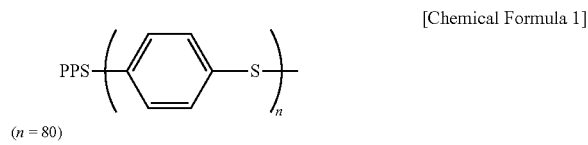

(n = 80)

As the constituent material for the bonding component 20b serving as the solute species, a thermosetting resin is used. For example, as the thermosetting resin, bisphenol A type epoxy (n=1, where n is the degree of polymerization) which is an epoxy resin expressed by Chemical Formula 2 is used.

[Chemical Formula 2]

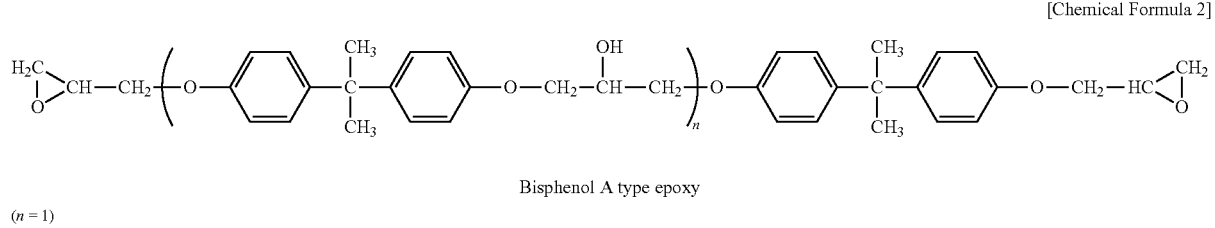

Bisphenol A type epoxy (n = 1)

Further, the solute concentration ρ [mol/m³], in other words, the total number density of the sum of the dispersed component density ρ1 and the flocculated component density ρ2 of the bonding component 20b in the base polymer 20a is defined as, for example, $2.0 \times 10^2$ mol/m³. The temperature [° C.] is defined at 310° C., and the pressure [atm] is defined at 1 atm.

Then, as Step 110, the interatomic interaction is set. Specifically, the force field serving as the parameter for determining the interatomic interaction which is the interaction between the atoms forming the base polymer 20a and the atoms forming the bonding component 20b, in other words, the factor for determining the calculation precision of the molecular simulation is set. Herein, it is assumed that, as the force field, for example, General Amber or TEAM_LS generally known in molecular simulation is applied.

Figure 10:
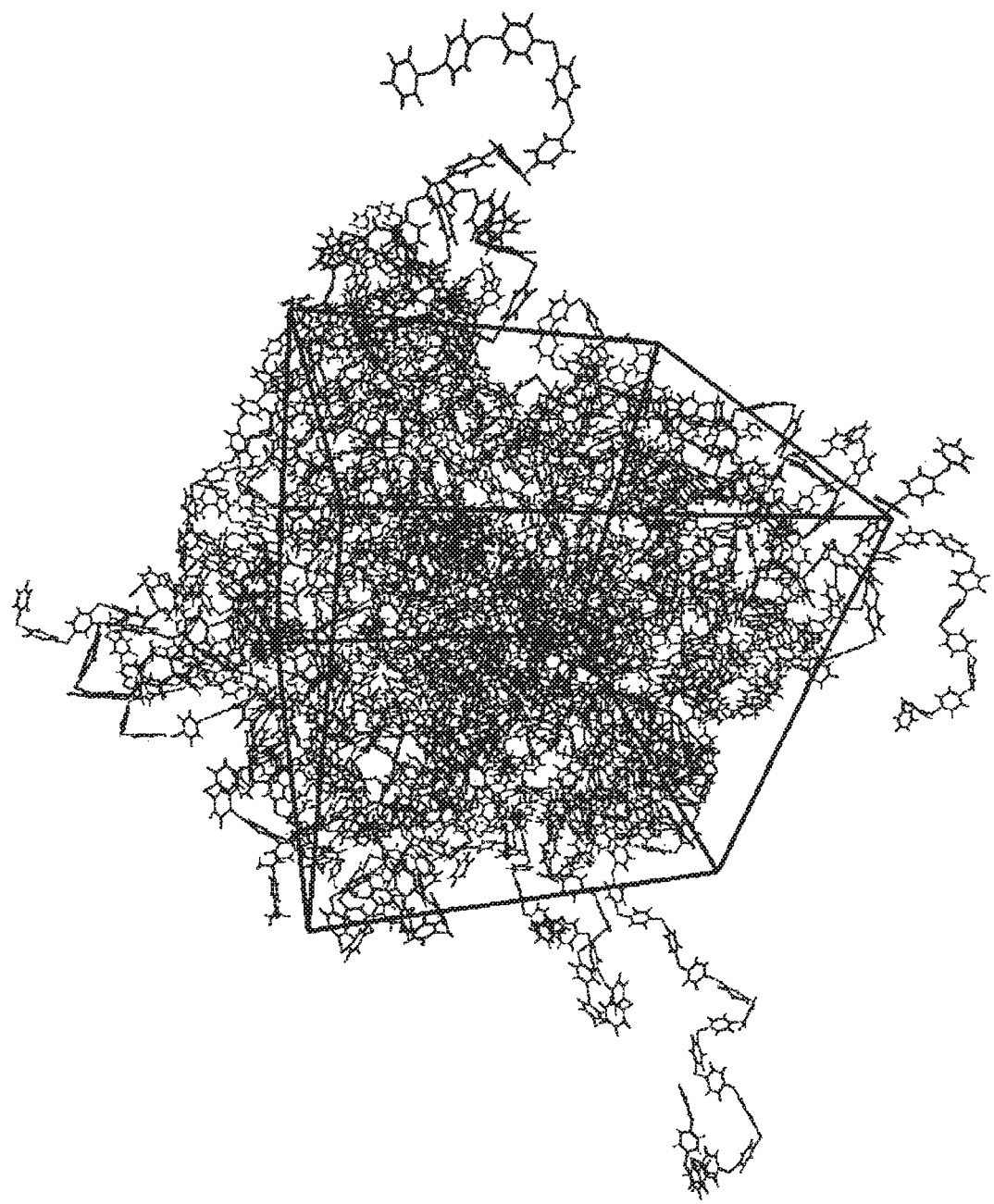
FIG. 10 is a view showing one example of a polymer for use as a molecular simulation model.

Subsequently, as Step 120, a molecular simulation model with a solute concentration of x% is formed. Further, as Step 130, the solvation free energy Δμ of a solute concentration of x% is calculated. The molecular simulation model is formed assuming the state in which the bonding component 20b serving as the solute species is dissolved in the base polymer 20a serving as the solvent species. For example, the model shown in FIG. 10 is formed. The Δμ1 which is the solvation free energy Δμ of a solute concentration of x% is calculated using the following Mathematical Expression 3.

Note that, in the Mathematical Expression 3, $k_B$ represents the Boltzmann constant, T represents the absolute temperature (Kelvin), v represents the energy by the solute-solvent interaction, and N represents the number of solvent molecules. Further, ri indicates the positional relation (distance) between the two polymers when the coordinates of one polymer are defined as (x1, x2, x3), and the coordinates of the other polymer are defined as (y1, y2, y3). In the Mathematical Expression 3, the portion surrounded by parentheses <> represents the value obtained in the following manner: the ensemble average of only the solvent, in other words, snapshots by molecular dynamics or Monte Carlo calculation are generated, and the mean value of all the snapshots is calculated.

[Mathematical Expression 3]
$$\Delta \mu = -k_B T \ln \left\langle \exp\left[-\frac{1}{k_B T} \sum_{i=1}^{N} v(ri)\right]\right\rangle_0$$

Further, as Step 140, a molecular simulation model of a solute concentration of 100% is formed. Still further, as Step 150, the solvation free energy Δμ of a solute concentration of 100% is calculated. The molecular simulation model is formed assuming that the bonding component 20b serving as a solute species is in a flocculated state in the base polymer 20a serving as a solvent species. The Δμ2 which is the solvation free energy Δμ of a solute concentration of 100% is calculated using the Mathematical Expression 3.

Note that, in the case of the solute concentration of 100%, the molecular simulation model is different as compared with the case of the solute concentration of x%. Accordingly, Δμ1 and Δμ2 which are the solvation free energies Δμ in respective cases are calculated as different values.

Then, in Step 160, the equilibrium constant α of dispersion-flocculation is calculated based on the Mathematical Expression 1 from the solvation free energy Δμ1 at a solute concentration of x% obtained in Step 130, and the solvation free energy Δμ2 at a solute concentration of 100% obtained in Step 130. Further, the solute concentration ρ of the bonding component 20b previously added into the base polymer 20a has been grasped. Accordingly, the dispersed component density ρ1 is calculated based on the equilibrium constant α of dispersion-flocculation calculated based on the Mathematical Expression 1, the solute concentration ρ, and the Mathematical Expression 2. In this case, it is confirmed that the relationship is satisfied in which the dispersed component density ρ1 is larger than the density $\rho 1_0$ of the C—O bonds necessary at the interface between the insert member 10 and the synthetic resin member 20 as shown in the Mathematical Expression 2. Then, when the relationship is satisfied, it can be assumed that the conditions set in Step 100 are the conditions capable of providing a desired bonding strength.

Herein, in setting of the prescribed value of the equilibrium constant α, the value when the target bonding strength (which will be hereinafter referred to as the bonding strength target) is defined at Ta [MPa (=N/mm²)] is defined as a prescribed value. Hereinafter, the technique of setting the prescribed value will be described by taking, as an example, the case where, for example, the insert component 10 is formed of an epoxy resin molded article, and is sealed by the synthetic resin member 20 obtained by adding an epoxy as the bonding component 20b to the base polymer 20a formed of a PPS resin.

When the insert component 10 and the synthetic resin member 20 are formed of such a material, these are bonded through the covalent bond by a C—O bond, or a hydrogen bond by a O . . . H bond at the interface.

For this reason, as a first step, the bonding force $F_B$ per chemical bond formed at the bonding interface, satisfying the bonding strength target Ta at the interface between the insert component 10 and the synthetic resin member 20, and the number density $\rho 1_0$ of the chemical bonds per unit volume required for satisfying the bonding strength target Ta are calculated.

First, in the case of the energy $E_B$ (L) when the chemical bonding part formed at the bonding interface has been moved by a displacement amount dL, the calculation method of the bonding force $F_B$ (L) per chemical bond formed at the bonding interface for every displacement amount dL will be shown. By reference to FIG. 11, the calculation method of the bonding force $F_B$ (L) will be described.

Figure 11:
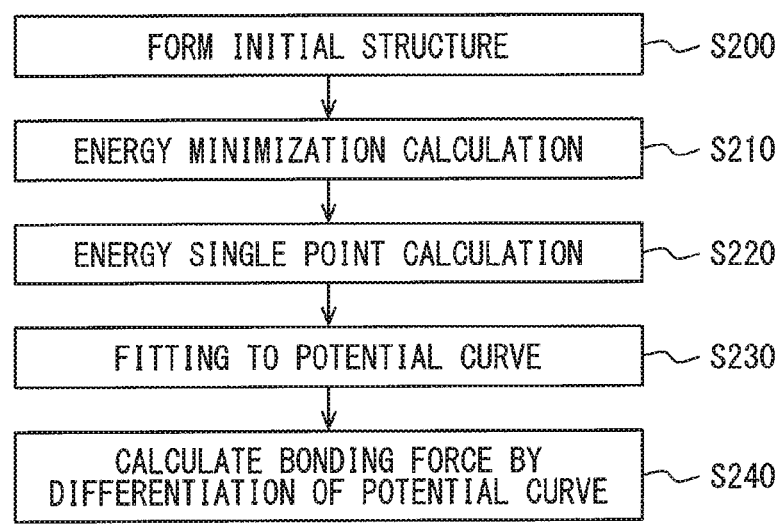
FIG. 11 is a flowchart of a molecular simulation for calculating the bonding force $F_B$ (L) per chemical bond formed at the bonding interface.
Figure 12:
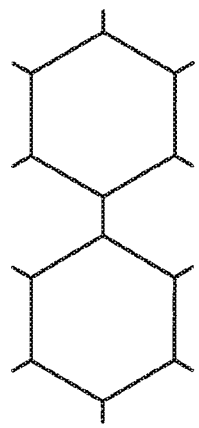
FIG. 12 is a view showing an example of a chemical bond subjected to modeling.

First, as shown in FIG. 11, as Step 200, an initial structure for performing modelling of the chemical bond at the chemically bonding part is manufactured. For example, the model indicating the bonding state between molecules in the polymer shown in FIG. 10 is extracted as the initial structure. For example, the structure shown in FIG. 12 is manufactured as the initial structure.

Then, as Step 210, an energy minimization calculation in the initial structure manufactured at Step 200 is performed. The energy minimization calculation means determination of the structure resulting in a stable state in which the force acting between molecules in the chemical bonds of the initial structure is minimized. Even in the initial structure, the force acting between molecules varies according to the distortion of the molecular structure, or the like. For this reason, the state in which the force is minimized is referred to as a stable state. The structure at this step is determined.

Subsequently, as Step 220, for the structure determined by performing the energy minimization calculation in Step 210, single point calculation of the energy $E_B$ (L) is performed by changing the displacement amount dL of the distance between molecules. For example, the energy $E_B(1)$ when displacement amount L=1 is calculated, and then, the energy $E_B(2)$ when displacement amount L=2 is calculated. The calculations are repeatedly performed. As a result, it is possible to determine the change in energy when the displacement amount dL is changed.

Then, as Step 230, the relationship between the displacement amount dL obtained in Step 220 and the energy is fitted to a potential function. As the fitting function, the following Mathematical Expression 4 can be obtained. Then, as Step 240, the mathematical expression indicating the potential curve obtained in Step 230 is differentiated with respect to the displacement amount dL. As a result, Mathematical Expression 5 can be obtained. The maximum value in the mathematical expression is taken as a coupling coefficient $F_B$ (L). Note that, in the following mathematical expression, De represents the dissociation energy, and $\beta$ represents the scale of the curve of the energy $E_B$ (L) at the minimum position.

$$E_B(L) = D_e[1 - \exp\{-\beta(L - L_0)\}]^2 \qquad \text{[Mathematical Expression 4]}$$

$$F_B(L) = -\frac{\partial E_B(L)}{\partial L} = 2D_e \beta \exp\{-\beta(L-L_0)\}[1 - \exp(-\beta(L-L_0))] \qquad \text{[Mathematical Expression 5]}$$

From this result, the bonding force $F_B$ per chemical bond formed at the bonding interface is calculated from the following expression in the case of, for example, a C—O bond.

$$F_{C-O}[\text{N/mol}] = \text{MAX}\left\{\frac{dE_{C-O}(L)[\text{N·m/mol}]}{dL[m]}, L \in R_+\right\} \qquad \text{[Mathematical Expression 6]}$$
$$= \text{MAX}\{F_B(L)\}, L \in R_+[\text{N/mol}]$$

Herein, the case where the chemical bond formed at the bonding interface is a covalent bond by a C—O bond, and the case of a hydrogen bond by a O . . . H bond will be considered.

<Case of Covalent Bond by C—O Bond>

Figure 13:
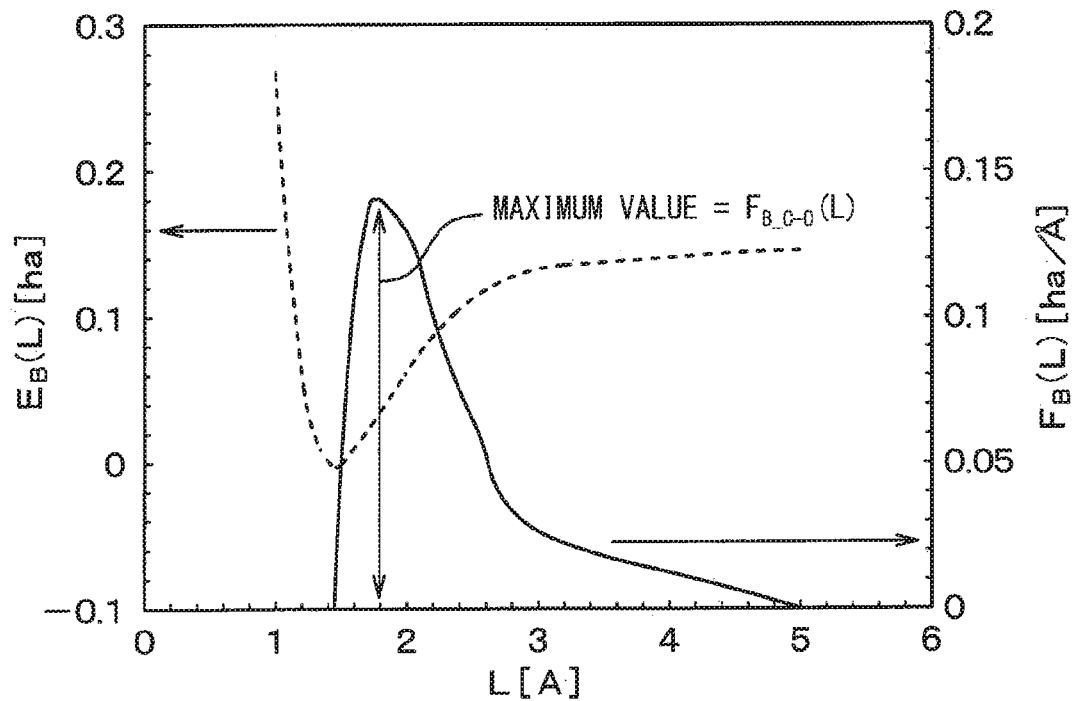
FIG. 13 is a view showing the energy $E_{B\_C-O}$ (L) and the bonding force $F_{B\_C-O}$ (L) when a displacement amount L is applied to the C—O bond.

First, the bonding force $F_{B\_C-O}$ (L) per C—O bond formed at the bonding interface per displacement amount dL is determined as in FIG. 13. The bonding force $F_{B\_C-O}$ per C—O bond formed at the bonding interface is $3.46 \times 10^{15}$ N/mol.

Then, the number density $\rho 1_0$ of the chemical bonds per unit volume required for satisfying the bonding strength target Ta is calculated from the following expression when the thickness of the synthetic resin layer contributing to the interface bonding is referred to as t.

$$\rho 1_0[\text{mol/m}^3] = Ta[MPa] \div F_{C-O}[\text{N/mol}] \div t[m] \qquad \text{[Mathematical Expression 7]}$$

When the bonding strength target Ta is defined as 15 MPa, $\rho 1_0$ is $4.34 \times 10^{-1}$ mol/m$^3$ from the following expression.

<Case of Hydrogen Bond by O . . . H Bond>

Figure 14:
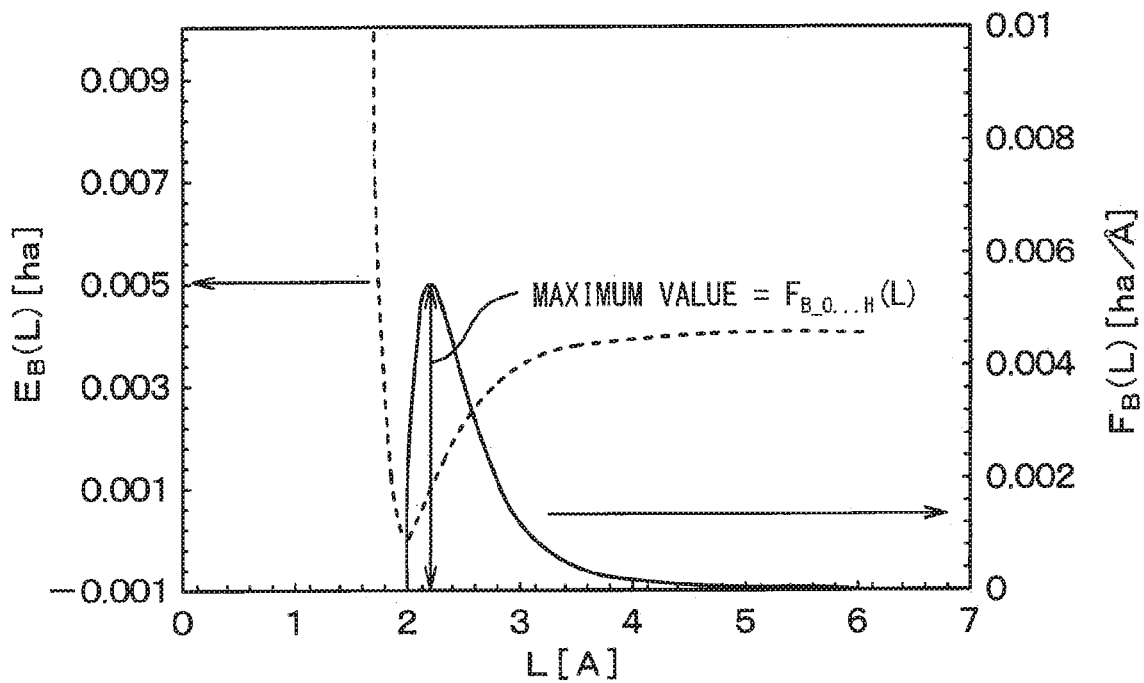
FIG. 14 is a view showing the energy $E_{B\_O-H}$ (L) and the bonding force $F_{B\_O-H}$ (L) when a displacement amount L is applied to the O . . . H bond.

First, the bonding force $F_{B\_O \ldots H}$ (L) per O . . . H bond formed at the bonding interface for every displacement amount dL is determined as in FIG. 14. The bonding force $F_{B\_O \ldots H}$ per O . . . H bond formed at the bonding interface is $1.32 \times 10^{14}$ N/mol. From the Mathematical Expression 7, $\rho 1_0$ when the bonding strength target Ta is defined as 15 MPa becomes $1.14 \times 10^1$ mol/m$^3$.

Then, when the dispersed component density $\rho 1$ (i.e., the equilibrium constant $\alpha$ of dispersion–flocculation) satisfies the Mathematical Expression 2 with respect to the thus calculated $\rho 1_0$, a structure is formed in which the base polymer 20a and the bonding component 20b for bonding with the insert component 10 having a functional group in the synthetic resin member 20 form a continuous phase (sea structure) and a flocculated phase (island structure), and bonding group component molecules in a number required for obtaining the target bonding strength with the insert component 10 are dispersed. Therefore, formation in such a structure can provide a desired bonding strength.

For example, in the case where calculation is performed in the Step 160 using GAFF (General AMBER Force Field)

as the force field for use in molecular simulation, when the calculation result of the equilibrium constant α is 3.5, and ρ defined as the calculation condition is $2.0 \times 10^2$ mol/m³. As a result, $\rho 1 = \{\alpha a/(1+\alpha)\} \times \rho = 3.5/4.5 \times 2.0 \times 10^2 = 1.56 \times 10^2$. Therefore, $\rho 1 = 1.56 \times 10^2$ is larger than the number density $\rho 1_{0\_C-O}$ ($4.34 \times 10^{-1}$ mol/m³) of the C—O bonds necessary for the case where the chemical bond formed at the bonding interface is a covalent bond by a C—O bond, and further is larger than the number density $\rho 1_{0\_O\ldots H}$ ($1.14 \times 10^1$ mol/m³) of the O . . . H bonds necessary for the case where the chemical bond formed at the bonding interface is a covalent bond by a O . . . H bond. For this reason, it is possible to achieve a desired bonding strength.

Whereas, in the case where calculation is performed in the Step 160 using TEAM_LS, when the calculation result of the equilibrium constant α is 1483.5, and ρ defined as the calculation condition is $2.0 \times 10^2$ mol/m³. As a result, $\rho 1 = \{\alpha/(1+\alpha)\} \times \rho = 1483.5/1484.5 \times 2.0 \times 10^2 = 2.0 \times 10^2$. Therefore, $\rho 1 = 2.0 \times 10^2$ is larger than the number density $\rho 1_{0\_C-O}$ ($4.34 \times 10^{-1}$ mol/m³) of the C—O bonds necessary for the case where the chemical bond formed at the bonding interface is a covalent bond by a C—O bond, and further is larger than the number density $\rho 1_{0\_O\ldots H}$ ($1.14 \times 10^1$ mol/m³) of the O . . . H bonds necessary for the case where the chemical bond formed at the bonding interface is a hydrogen bond by a O . . . H bond. For this reason, it is possible to achieve a desired bonding strength.

As described hereinabove, for the resin molded article, the synthetic resin member 20 for sealing the insert component 10 is formed of a thermoplastic resin serving as the base polymer 20a, and into which a bonding component 20b formed of a thermosetting resin or the like is added. The synthetic resin member 20 has a structure in which the base polymer 20a and the bonding component 20b form a continuous phase (sea structure) and a flocculated phase (island structure), and bonding component molecules in a number required for obtaining the target bonding strength with the insert component 10 are dispersed. Accordingly, the functional group of the bonding component 20b added to the synthetic resin member 20 chemically reacts with the functional group present at the surface of the insert component 10. This can provide a higher bonding strength.

Further, various conditions of secondary molding are set so as to satisfy the above conditions. Then, using a molecular simulation model, the solvation free energies $\Delta \mu 1$ and $\Delta \mu 2$ at a solute concentration of x% and at 100% are calculated, from which the equilibrium constant α is calculated. Then, when the dispersed component density $\rho 1$ calculated with the solute concentration ρ and the equilibrium constant α is larger than the density $\rho 1_0$ of C—O bonds required for the interface obtained in the above-described manner, it is possible to confirm that a desired bonding strength can be obtained in the synthetic resin member 20.

Thus, using molecular simulation while changing various conditions of the secondary molding, it is confirmed that the synthetic resin member 20 can have a structure in which a continuous phase (sea structure) and a flocculated phase (island structure) are formed, and bonding component molecules in a number required for obtaining the target bonding strength with the insert component 10 are dispersed in the continuous phase. Using the conditions capable of providing the structure in which a required number of bonding component molecules are dispersed in the continuous phase, the synthetic resin member 20 is formed. As a result, it is possible to achieve a higher bonding strength in the resin molded article formed by sealing the insert component 10 by the synthetic resin member 20.

(Other Embodiments)

The present disclosure is not limited to the embodiment described above, and may be appropriately modified without departing from the gist of the present disclosure.

For example, as an example of the insert component 10, the primary molded product of a thermosetting resin was mentioned. As an example of the thermosetting resin, an epoxy resin or the like was mentioned. Whereas, as an example of the synthetic resin member 20, mention was made of the example in which PPS or PBT was the base polymer 20a, and an epoxy resin or the like was the bonding component 20b. However, these are merely examples, and other materials are also acceptable. For example, the insert component 10 is not limited to the primary molded product of a thermosetting resin, but may be a metal component or the like. Further, as for the shape or the like of the resin molded article, the examples described in the embodiment are examples, and other shapes are also acceptable.

Whereas, as one example of the force field for use in molecular simulation, General Amber or TEAM_LS was mentioned as an example. However, it is naturally understood that it does not matter if other force fields are used.

Further, in the embodiment, the bonding form between the dispersed component 20ba in the bonding component 20b contained in the synthetic resin member 20, and the functional group of the insert component 10 was described by taking a covalent bond and a hydrogen bond as examples. However, these are merely examples of the bonding form. The same as for the embodiment also applies to other bonding forms, for example, the case where the functional group of the insert component 10 and the dispersed component 20ba are coordinated or are ionically bonded. Also as for the coordinate bond or the ionic bond, as with the case of the covalent bond or the hydrogen bond, molecular simulation such as calculation of the bonding force $F_B(L)$ per chemical bond can be performed. This can provide the same effects as those described above

The invention claimed is:

1. A resin molded article comprising:
   an insert component provided by a primary molded product of a thermosetting resin, or a metal component, and having a functional group; and
   a synthetic resin member sealing the insert component, and provided by a synthetic resin that has a base polymer of a thermoplastic resin and a bonding component bonding with the functional group included in the insert component, wherein
   the synthetic resin member has a sea structure formed of a continuous phase including the base polymer,
   at least a part of the bonding component is present as a dispersed component in the sea structure,
   the dispersed component bonds with the functional group included in the insert component,
   the synthetic resin member has the continuous phase formed of the base polymer, and an island structure formed of a flocculated phase including a part of the bonding component flocculated in the flocculated phase,
   the dispersed component different from the island structure of the bonding component bonds with the functional group included in the insert component,
   the bonding component has an equilibrium constant α, which is a constant of dispersion and flocculation of the bonding component in the base polymer,
   the equilibrium constant α is expressed by Mathematical Expression 1:

$$\alpha = \rho_1/\rho_2 = \exp\left(-\frac{\Delta\mu_1 - \Delta\mu_2}{RT}\right), \quad \text{[Mathematical Expression 1]}$$

wherein
- a solute concentration $\rho$ is obtained by dividing a number of molecules of the bonding component in the synthetic resin member by a volume of the base polymer, and
- a chemical bond density $\rho 1_0$ is a density of chemical bonds including any of a covalent bond, a coordinate bond, an ionic bond, and a hydrogen bond satisfying bonding energy required for obtaining a target bonding strength at an interface between the insert member and the synthetic resin member,
- a dispersed component density $\rho 1$ is a density of the dispersed component of the bonding component,
- a flocculated component density $\rho 2$ is a density of the flocculated component of the bonding component,
- a first solvation free energy $\Delta\mu 1$ is a solvation free energy when the solute concentration is defined at x %,
- a second solvation free energy $\Delta\mu 2$ is a solvation free energy when the solute concentration is defined at 100%,
- R represents an ideal gas constant,
- T represents an absolute temperature (in Kelvin), and
- the dispersed component density $\rho 1$ and the equilibrium constant $\alpha$ satisfy Mathematical Expression 2:

$$\rho 1 = \left\{\frac{\alpha}{1+\alpha}\right\} \times \rho > \rho 1_0. \quad \text{[Mathematical Expression 2]}$$

2. A method for manufacturing a resin molded article, the resin molded article including:
- an insert component provided by a primary molded product of a thermosetting resin, or a metal component, and having a functional group; and
- a synthetic resin member sealing the insert component, and provided by a synthetic resin that has a base polymer of a thermoplastic resin and a bonding component bonding with the functional group included in the insert component, wherein
- the synthetic resin member has a sea structure formed of a continuous phase including the base polymer, at least a part of the bonding component is present as a dispersed component in the sea structure, and the dispersed component bonds with the functional group included in the insert component, the synthetic resin member has the continuous phase formed of the base polymer, and an island structure formed of a flocculated phase including a part of the bonding component flocculated in the flocculated phase,
- the dispersed component different from the island structure of the bonding component bonds with the functional group included in the insert component the method comprising:
- performing a molecular simulation, and setting conditions for molding, the performing of the molecular simulation including:
- setting conditions for molding the synthetic resin member, the conditions including a temperature and a pressure during molding of the synthetic resin member, a solute concentration $\rho$ that is a value obtained by dividing a number of molecules of a bonding component by a volume of the base polymer, a constituent material of the bonding component serving as a solute species, and a constituent material of the base polymer serving as a solvent species;
- setting an interatomic interaction that is an interaction between atoms forming the base polymer and atoms forming the bonding component;
- calculating a first solvation free energy $\Delta\mu 1$ when the solute concentration is defined at x %;
- calculating a second solvation free energy $\Delta\mu 2$ when the solute concentration is defined at 100%;
- calculating an equilibrium constant $\alpha$ of dispersion and flocculation of the bonding component in the base polymer based on the first and second solvation free energies, and calculating a dispersed component density $\rho 1$ that is a density of the dispersed component of the bonding component based on the equilibrium constant $\alpha$ and the solute concentration $\rho$, wherein a density of chemical bonds including any of a covalent bond, a coordinate bond, an ionic bond, and a hydrogen bond satisfying a bonding energy required for obtaining a target bonding strength at an interface between the insert member and the synthetic resin member is defined as $\rho 1_0$, and the equilibrium constant $\alpha$ is expressed by Mathematical Expression 1, $$\alpha = \rho_1/\rho_2 = \exp\left(-\frac{\Delta\mu_1 - \Delta\mu_2}{RT}\right), \quad \text{[Mathematical Expression 1]}$$

wherein R represents an ideal gas constant and T represents an absolute temperature (in Kelvin); and
confirming that the dispersed component density $\rho 1$ and the equilibrium constant $\alpha$ satisfy Mathematical Expression 2

$$\rho 1 = \left\{\frac{\alpha}{1+\alpha}\right\} \times \rho > \rho 1_0. \quad \text{[Mathematical Expression 2]}$$

3. The method for manufacturing a resin molded article according to claim 2, wherein
- the calculating of the first solvation free energy includes:
- forming a molecular simulation model at the solute concentration $\rho$ of x %, and
- calculating, based on the molecular simulation model, the first solvation free energy, and
- the calculating of the second solvation free energy includes:
- forming a molecular simulation model at the solute concentration $\rho$ of 100%, and
- calculating, based on the molecular simulation model, the second solvation free energy.

* * * * *